Confining & ...
Stalls.

W. C. DAVOL, Jr.

HORSE-STALLS FOR STEAM FIRE-ENGINE HORSES.

Reissued Jan. 2, 1877.

No. 7,454.

7,454. HORSE-STALLS FOR STEAM ENGINE HOUSES. Wm. C. Davol, Jr., River, Mass. Patent No. 144,068, da Oct. 28, 1873. [Filed Nov. 13, 1876.]

*Brief.*—The stalls have mangers and doo in front, so that the horses can go to the gine without being backed out of the stal 1. One or more stalls, A, opening into t carriage or engine room or space E, and ha ing the manger M of each stall at the end thereof which is next the said room or space E.

2. One or more stalls, A, opening into the carriage or engine room E, and into a passage, B, in rear of such stall or stalls, and having the manger M of each or either stall arranged at that end of the stall which is n to such carriage or engine room.

3. One or more stalls, A, opening into the carriage-space or engine-room E, and provided with a door, D, to the opening d, and a manger, M, arranged at the door end of the stall, all substantially as set forth.

4. One or more stalls, A, open in rear into a passage, B, and in front into a carriage or engine room, E, and provided, at or near the front opening, with a door or a manger, or both, all being substantially as and for the purpose set forth.

Fig. 1.

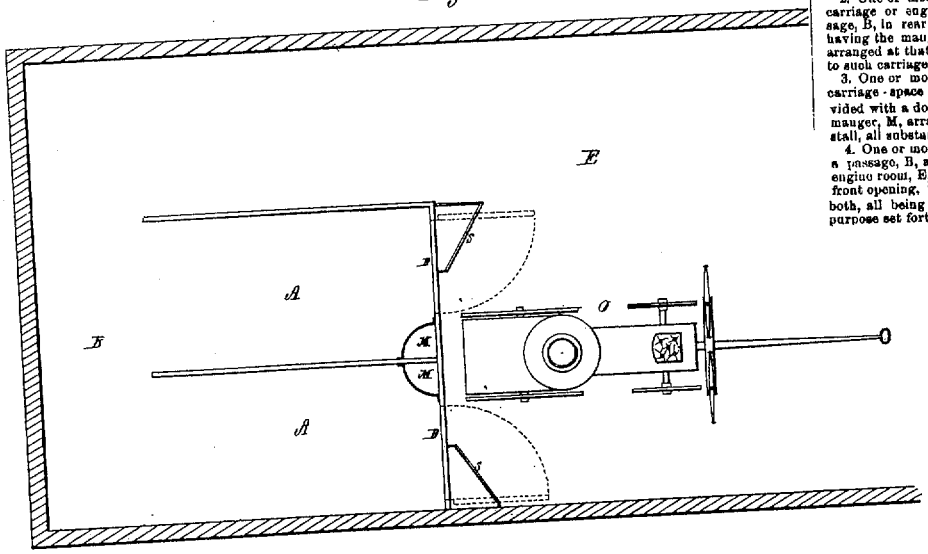

Fig. 3.

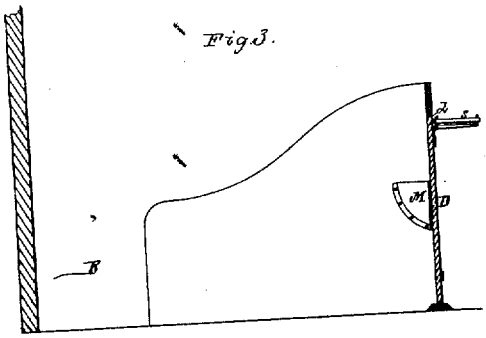

Fig. 2.

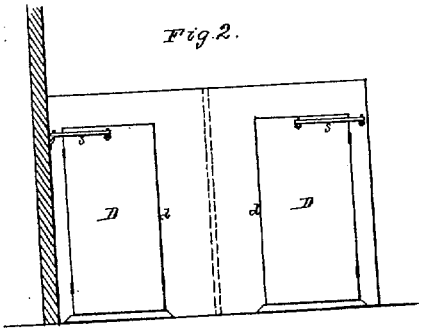

Witnesses.
S. N. Piper
L. A. Müller

William C. Davol Jr.
by his attorney
R. H. Eddy.

N. PETERS, PHOTO-LITHOGRAPHER, WASHINGTON, D. C.

UNITED STATES PATENT OFFICE.

WILLIAM C. DAVOL, JR., OF FALL RIVER, MASSACHUSETTS.

IMPROVEMENT IN HORSE-STALLS FOR STEAM FIRE-ENGINE HOUSES.

Specification forming part of Letters Patent No. 144,068, dated October 28, 1873; reissue No. 7,454, dated January 2, 1877; application filed November 13, 1876.

*To all whom it may concern:*

Be it known that I, WILLIAM C. DAVOL, JR., of Fall River, of the county of Bristol, of the State of Massachusetts, have invented a new and useful Improvement in the Stables for Steam Fire-Engines; and I do hereby declare the same to be fully described in the following specification, and represented in the accompanying drawings, of which—

Figure 1 denotes a plan of a stable with its two stalls provided with my improvement. Fig. 2 is a front view of the stalls; and Fig. 3, a vertical and longitudinal section taken through one of them.

My said invention or improvement, having reference to a steam fire-engine stable, may be said to be as follows: first, one or more stalls opening into the carriage or engine room, and having the manger of each stall at the end thereof which is next to the said carriage or engine room; second, one or more stalls opening into the carriage or engine room, and into a passage in rear of such stall or stalls, and having the manger of each or either stall arranged at that end of the stall which is next to such carriage or engine room; third, one or more stalls opening into the carriage-space or engine-room, and provided with a door to the opening and a manger at the door end of the stall, all substantially as set forth; fourth, one or more stalls, open in rear into a passage, and in front into a carriage or engine room, and provided at the front opening with a door or a manger, or both, all being substantially as and for the purpose or purposes specified.

In carrying out my invention in full, or in its most approved form, instead of constructing each stall open at its rear end, and with its manger at the opposite end and next the end or wall of the stable, so that a horse, to be taken from the stall, has to back out of it, or stands with his head toward the wall, I arrange the stall so as to open at its end upon an induction-passage, B, arranged between such stall and the end wall of the building; and, furthermore, I arrange the manger M at the end of the stall next to the engine room or space E, and close said end, except in providing it with a doorway, *d*, sufficient for the horse to pass through, such opening being furnished with a door, D, and leading into the space E, for stabling the steam fire-engine O. The passage B, in rear of the stall or stalls, opens into a prolongation of it alongside of one of them, and leads into the space E, in manner as shown. The horses, while in the stalls, thus stand with their heads next the doors and toward the engine.

To each of the doors and the stalls a spring, S, or other proper device, is to be applied to suddenly pull open the door; and, furthermore, each door should have a locking or bolting apparatus to keep it closed while it may be necessary to have the horses in the stalls.

Such fastenings may be provided with mechanism by which they may be simultaneously operated, whether by manual power or by electricity, so as to enable the springs to suddenly open the doors.

On an alarm of fire being given, an attendant is to so actuate the door-fastenings as to set open the doors, both of which will immediately open, and the horses, properly trained for the purpose, will immediately pass out of the stalls and take their places alongside of the pole of the engine, thus saving all the time heretofore required to back out or from the stalls the animals, and turn them round and lead them to the pole.

By a rope stretched across that open end which is next the induction-passage B of each stall, each horse, standing with his tail toward the rope, will be kept in the stall until the door may be opened for him to escape.

I claim, in a steam fire-engine stable, as follows:

1. One or more stalls, A, opening into the carriage or engine room or space E, and having the manger M of each stall at the end thereof which is next the said room or space E.

2. One or more stalls, A, opening into the carriage or engine room E, and into a passage, B, in rear of such stall or stalls, and having the manger M of each or either stall arranged at that end of the stall which is next to such carriage or engine room.

3. One or more stalls, A, opening into the carriage-space or engine-room E, and provided with a door, D, to the opening *d*, and a manger, M, arranged at the door end of the stall, all substantially as set forth.

4. One or more stalls, A, open in rear into a passage, B, and in front into a carriage or engine room, E, and provided, at or near the front opening, with a door or a manger, or both, all being substantially as and for the purpose set forth.

WILLIAM C. DAVOL, JR.

Witnesses:
E. H. B. BROW,
R. W. MORVILLE, Jr.